United States Patent [19]
Snyder

[11] Patent Number: 5,520,187
[45] Date of Patent: May 28, 1996

[54] ULTRASONIC PROBE WITH PROGRAMMABLE MULTIPLEXER FOR IMAGING SYSTEMS WITH DIFFERENT CHANNEL COUNTS

[75] Inventor: Jonathan E. Snyder, Whitefish Bay, Wis.

[73] Assignee: General Electric Company, Milwaukee, Wis.

[21] Appl. No.: 344,918

[22] Filed: Nov. 25, 1994

[51] Int. Cl.$^6$ ............................................. A61B 8/00
[52] U.S. Cl. ........................................... 128/661.010
[58] Field of Search ................. 128/660.010, 660.070, 128/661.010; 73/626; 327/407

[56] References Cited

U.S. PATENT DOCUMENTS

| | | | |
|---|---|---|---|
| 4,372,323 | 2/1983 | Takemura et al. | 128/661.010 |
| 4,628,738 | 12/1986 | Burckhardt et al. | 128/661.010 |
| 4,811,740 | 3/1989 | Ikeda et al. | 128/660.010 |
| 5,205,175 | 4/1993 | Garza et al. | 128/660.010 X |

Primary Examiner—Francis Jaworksi
Attorney, Agent, or Firm—Dennis M. Flaherty; John H. Pilarski

[57] ABSTRACT

A programmable probe multiplexer which can be reconfigured for use with multiple imaging systems having different channel counts. The probe uses a system code that informs the multiplexer of the number of channels on the system to which it is connected. The multiplexer hardware in turn adjusts the program or channel map to reconfigure the probe to accommodate the system. In particular, the probe can sense the presence of a system type and then reconfigure and optimize performance automatically, or the probe can be reprogrammed by the system, allowing great flexibility in the design and optimization of imaging parameters. The probe supports this concept through the use of a series of programmable switches and the appropriate logic to assign input channels to output channels.

18 Claims, 4 Drawing Sheets

ULTRASONIC PROBE WITH PROGRAMMABLE MULTIPLEXER FOR IMAGING SYSTEMS WITH DIFFERENT CHANNEL COUNTS

FIELD OF THE INVENTION

This invention generally relates to ultrasound imaging of human tissue and blood. In particular, the invention relates to the multiplexing of acoustic image data from an ultrasonic probe having an array of transducer elements to a bank of imaging channels.

BACKGROUND OF THE INVENTION

Conventional ultrasound imaging systems comprise an array of ultrasonic transducer elements which are used to transmit an ultrasound beam and then receive the reflected beam from the object being studied. For ultrasound imaging, the array typically has a multiplicity of transducer elements arranged in a line and driven with separate voltages. By selecting the time delay (or phase) and amplitude of the applied voltages, the individual transducer elements can be controlled to produce ultrasonic waves which combine to form a net ultrasonic wave that travels along a preferred vector direction and is focussed at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focussed at a succession of ranges along the scan line as the reflected ultrasonic waves are received.

FIG. 1 depicts an ultrasound imaging system consisting of four main subsystems: a beamformer 2, processors 4 (including a separate processor for each different mode), a scan converter/display controller 6 and a kernel 8. System control is centered in the kernel, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. The scan converter broadcasts the vector parameters defined by the host to the subsystems via scan control bus 18.

The main data path begins with the analog RF inputs to the beamformer 2 from the transducer 20. The beamformer 2 outputs two summed digital baseband I,Q receive beams. The I,Q data is input to a processor 4, where it is processed according to the acquisition mode and output as processed vector (beam) data to the scan converter/display processor 6. The scan converter accepts the processed vector data and outputs the video display signals for the image to a color monitor 22.

The task of the ultrasound transducer in the diagnostic imaging system is to provide a stable, specified level of performance for transduction of electrical energy into acoustic energy and vice versa. Classically, the transduction process is established through the use of a piezoelectric sensor which is designed to function optimally on one type of imaging system. This is required because the system parameters of number of elements and aperture size are fixed by the system designers, not the transducer engineers.

To meet the image size or field of view requirements for a particular application, multiplexers are conventionally incorporated into probes, allowing the use of a transducer with more elements than the system has channels. Because the multiplexer allows the use of probes with more elements than system channels, it is an extremely powerful tool for improving image quality. The problem this creates is that the probe hardware is optimized for a single imaging system, i.e., one which has the correct number of system channels.

The current diagnostic imaging system requirements vary for different applications. For example, ultrasonic imaging systems may have any number of channels, e.g., 64 or 128. In order to maintain a family of diagnostic ultrasound transducers which can support these different imaging systems, a large number of probe types and the corresponding manufacturing burden are required. One method to decrease this manufacturing load is to provide a probe type which can be utilized for a family of imaging systems having different channel counts.

SUMMARY OF THE INVENTION

The present invention is a transducer probe assembly having a programmable multiplexer for reconfiguring the transducer probe for use with multiple imaging systems having different channel counts. This eliminates the need for designing a specific transducer probe for each different imaging system. The conventional probe assembly comprises a transducer head, a transducer connector which plugs into a port of the imaging system and a coaxial cable which connects the head to the connector. The programmable multiplexer can be integrated into the transducer connector or the transducer head.

In accordance with the invention, the probe uses a system code that informs the multiplexer of the number of channels on the system to which it is connected. The multiplexer hardware in turn adjusts the program or channel map to reconfigure the probe to accommodate the system. In this way the probe is usable on more than one imaging system, improving the productivity of the design and reducing equipment cost. In particular, the probe can sense the presence of a system type and then reconfigure and optimize performance automatically, or the probe can be reprogrammed by the system, allowing great flexibility in the design and optimization of imaging parameters. The probe supports this concept through the use of a series of programmable switches and the appropriate logic to assign input channels to output channels.

DETAILED DESCRIPTION OF THE PREFERRED EMBODIMENTS

Figure 1:
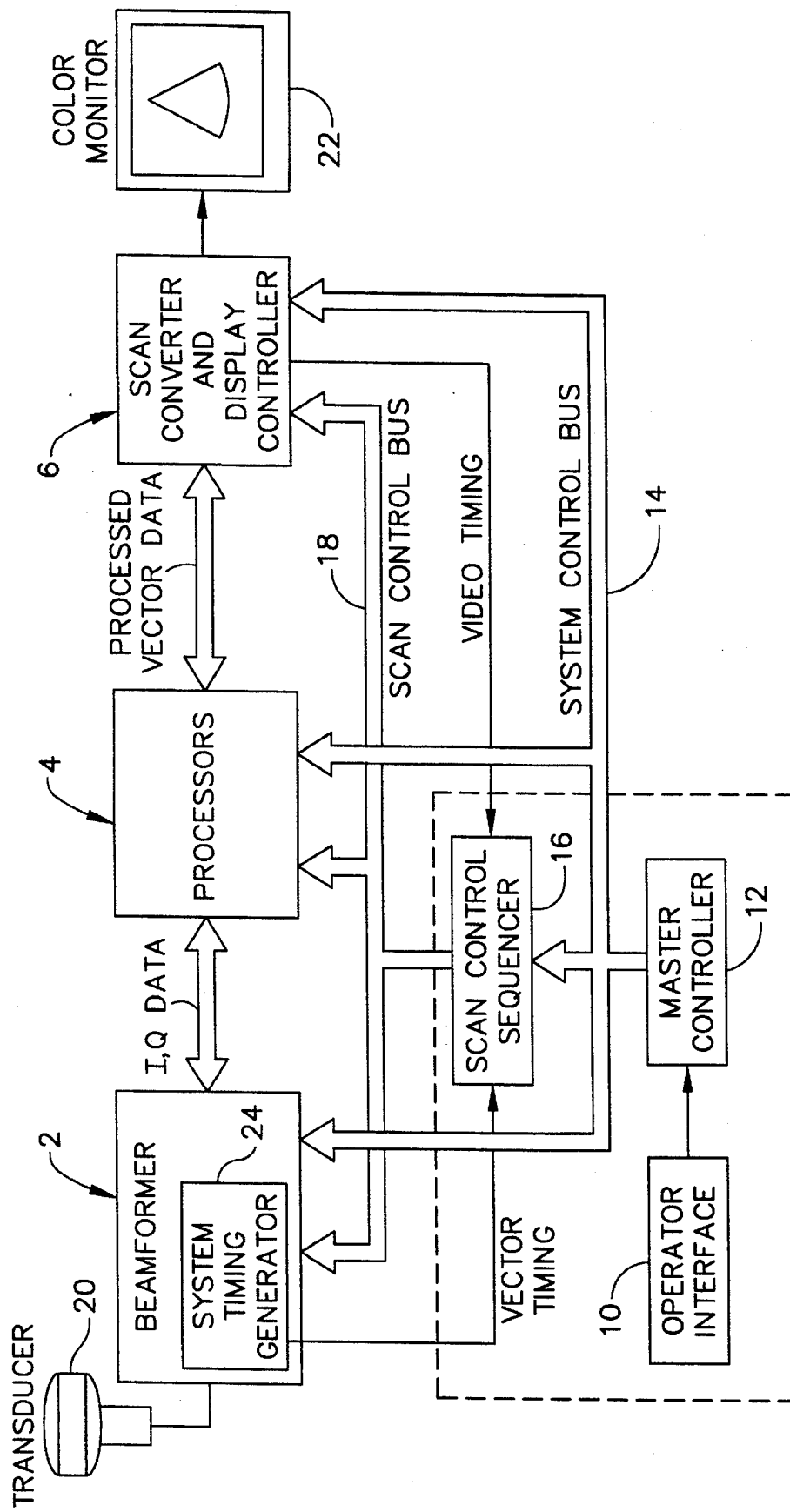
FIG. 1 is a block diagram of an ultrasound imaging system in which the present invention is incorporated.

In accordance with the preferred embodiment of the present invention, a transducer multiplexer control program is stored in the master controller 12 (see FIG. 1). The master controller receives probe ID signals from the transducer probe assembly via a transducer interface (not shown) and then outputs the commutation state to a commutation state memory (not shown) on the transducer interface. The commutator state information stored in memory is used to control the transducer multiplexer. Radiofrequency data from the transducer element array is thus multiplexed from the transducer connector to the beamformer under the control of the master controller.

Figure 2:
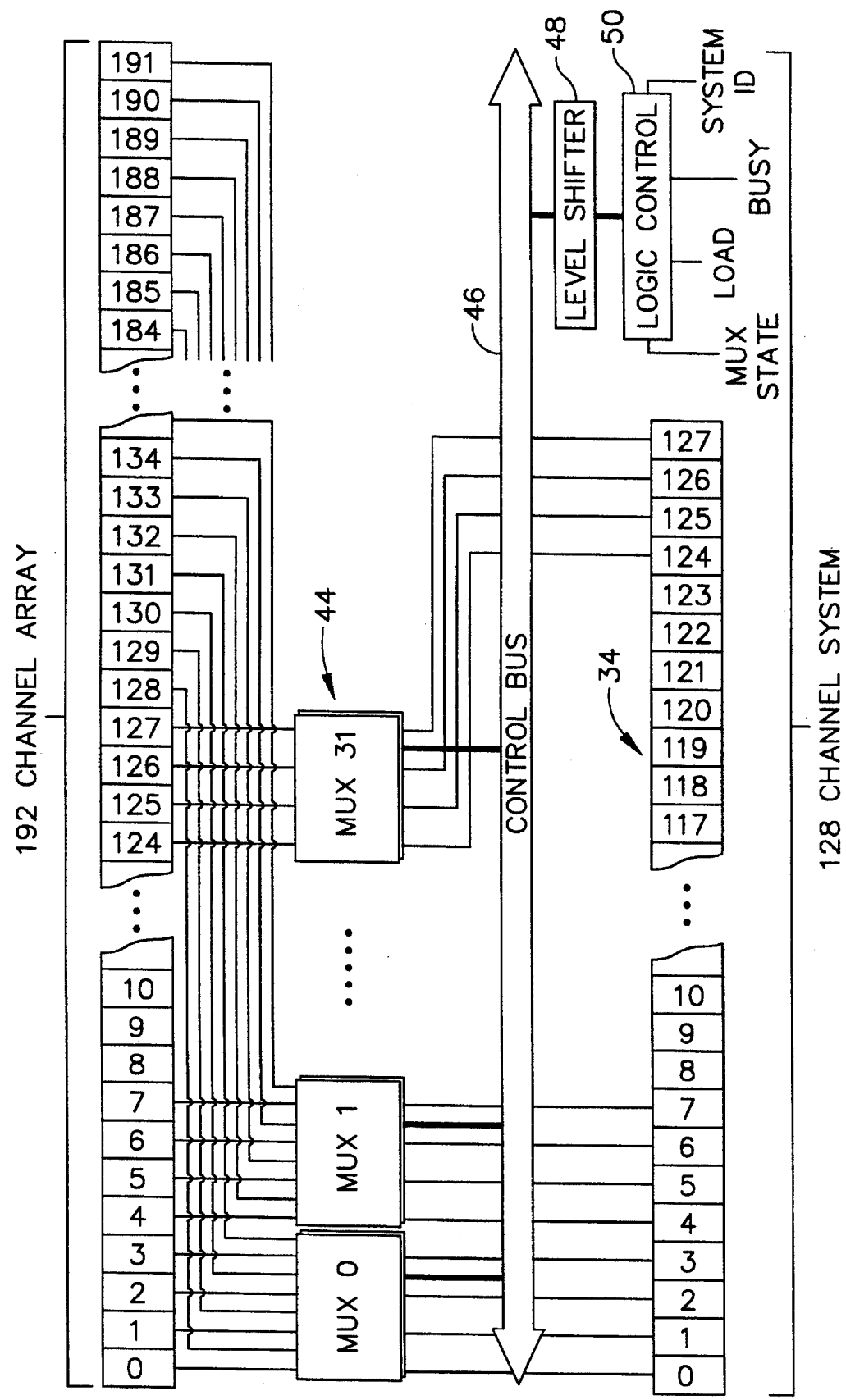
FIG. 2 is a block diagram showing the transducer multiplexer connections for multiplexing a 192-channel transducer array to a 128-channel beamformer in accordance with a preferred embodiment of the invention.

The multiplexing scheme shown in FIG. 2 allows the system to select an imaging aperture from within the total available aperture. This multiplexer is designed for use with imaging systems having different numbers of system channels.

The block diagram of FIG. 2 illustrates the conceptual design of the 192-channel multiplexer. Each element (0 to 191) of the transducer array 42 is connected directly to one input of one of a plurality of multiplexer integrated circuits 44 (MUX 0 to MUX 31). Each multiplexer chip is composed of eight analog switches wired in one of two ways. Devices which must switch connections between two transducer elements are wired to form a 2:1 multiplexer. The remainder are wired as single-pole single-throw switches, facilitating eight analog channels per integrated circuit 44. Each multiplexer chip output is connected directly to the beamformer system input. The design also includes a series of logic controls, indicated in FIG. 2 as the control bus 46. These lines are driven via level shifter 48 by digital logic control circuitry 50 which controls the configuration of the individual switches in the analog switch array.

The multiplexer is controlled by a parameter called MUX State. This is a 9-bit number presented to the multiplexer logic control by the system. Table 1 demonstrates this logic system for the 192-element-array multiplexer.

TABLE I

192-ELEMENT PROBE MUX STATES VS. COMMUTATOR STATE

| MUX State | System Channels | Transducer Channels |
|---|---|---|
| 0 | 0–127 | 0–127 |
| 1 | 0, 1–127 | 128, 1–127 |
| 2 | 0–1, 2–127 | 128–129, 2–127 |
| 3 | 0–2, 3–127 | 128–130, 3–127 |
| 4 | 0–3, 4–127 | 128–131, 4–127 |
| . | . | . |
| . | . | . |
| 62 | 0–61, 62–127 | 128–190, 62–127 |
| 63 | 0–62, 63–127 | 128–191, 63–127 |

In state 0, the multiplexer connects the first 128 elements of the transducer array directly to the system. Incrementing the multiplexer simply disconnects transducer element 0 from system channel 0 and connects transducer element 128, i.e., to increment from state X to state X+1, element X is disconnected from system channel X and element X+128 is connected.

Figure 3:
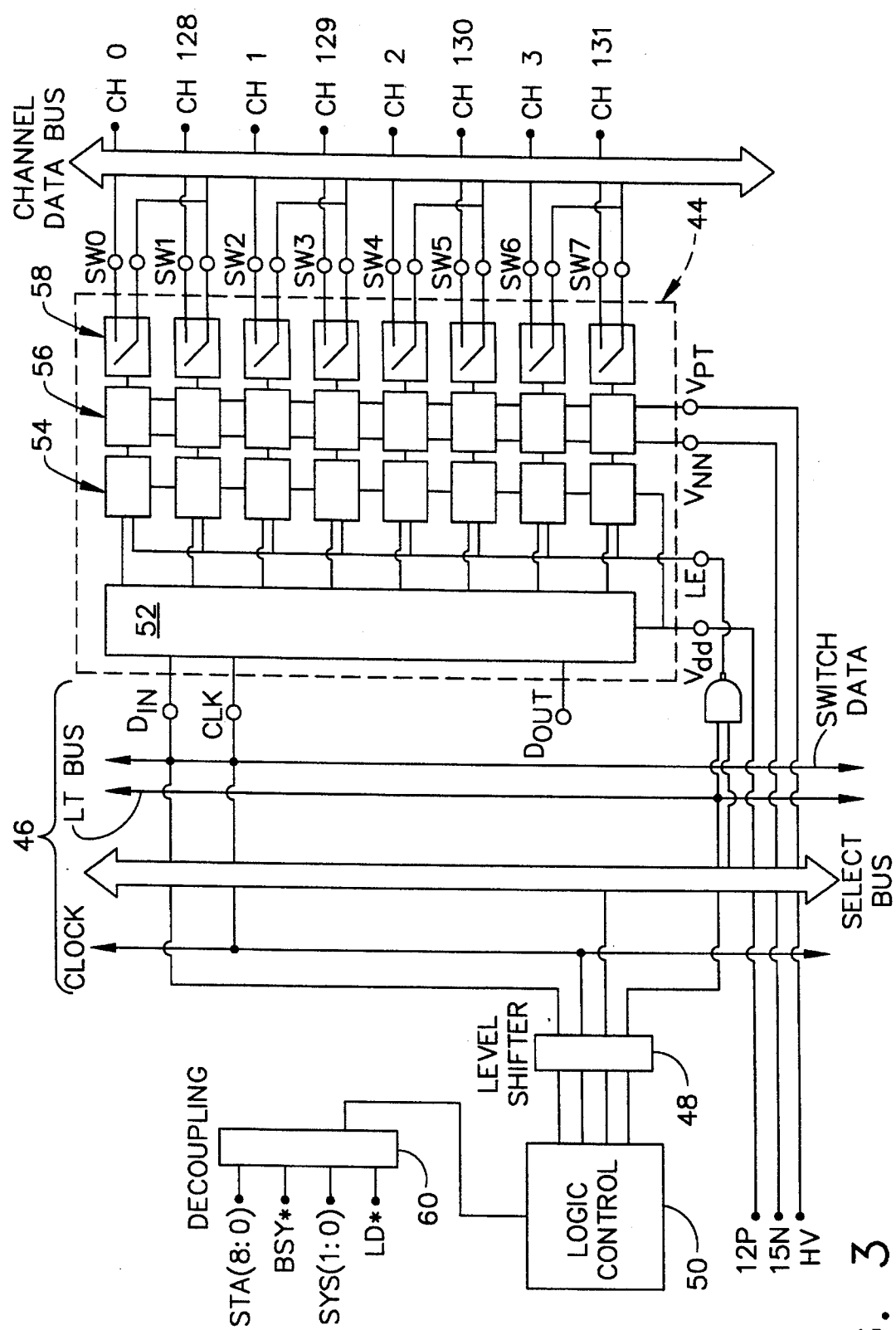
FIG. 3 is a logic diagram of a portion of the transducer multiplexer circuit shown in FIG. 2.

The circuit depicted in FIG. 3 is designed to provide the 128-channel system with the capability to service up to 256 elements on the transducer array. Each multiplexer chip 44 is an 8-channel high-voltage analog switch designed to switch up to eight analog signal lines via digital control. As seen in FIG. 3, the chip is composed of four sections: a shift register 52 for storage of the switch data; a latch 54 to lock in the data; level shifters 56 to drive the analog switches; and the switches 58 themselves. The switches 58 are connected to the system channel bus and the transducer elements in a 2:1 multiplexer configuration. For example, to connect element 0 to channel 0, SW0 must be closed and SW1 open. The reverse will connect element 128, releasing element 0. This scheme relies on the controller to prevent multiple elements from connection to the same system channel.

The logic control of analog switch 44 is provided by the logic controller 50. The logic controller is preferably a programmable digital logic device which integrates all of the other functions required to drive the analog switch into a single package. These functions may include device selection, clock driver, level shifting and switch latch control.

During operation, the logic controller maps the state provided by the system into the analog switches. The controller is driven by inputs from a local clock, state input lines, system type, and a load pulse from the system. With valid state data and a load pulse, the logic control device will activate the clock, shift data into the analog switches, and then latch the data. After signaling to the system that the state change is complete, the multiplexer shuts down, remaining inactive until the next load pulse is received. All data lines into logic controller 50 are decoupled by a conventional electrostatic discharge protection circuit 60 to prevent damage from electrostatic discharge.

The probe multiplexer is designed to accommodate the requirements of at least two imaging systems having different numbers of channels. Because of the difference in channel count between the two systems, the logic controller 50 must be able to recognize a system ID from a 2-bit input.

The logic controller must also map the state provided by the system into the multiplexer configuration. This translation and the corresponding implementation circuitry comprise the majority of the controller functionality.

The analog switch depicted in FIG. 3 is actually eight analog single-pole single-throw switches, configured to form four 2:1 multiplexers. Therefore, each individual switch requires two control bits in the latch, a total of 8 bits for each analog switch.

The transducer interface provides the following signal set to control the probe multiplexer: STA(8:0), 9 bits of MUX state information; LD*, Load Data Strobe, for latching STA data on the rising edge; BSY*, 1 bit of data indicating the status of the multiplexer (the multiplexer returns one bit, the high state indicating that the multiplexer has finished changing states and is ready); and SYS(1:0), 2 bits of system definition data which are sent to the probe (these System ID bits configure the probe multiplexer and allow it to correctly interpret the state information). The 9 bits of MUX state information are generated by the master controller. For a System ID identifying a 128-channel imaging system, the probe multiplexer selects a group of 128 contiguous elements in the transducer array on a vector-by-vector basis in accordance with a first MUX state mapping (see Table 1). For a System ID identifying a 64-channel imaging system, the probe multiplexer selects a group of 64 contiguous elements in the transducer array on a vector-by-vector basis in accordance with a second MUX state mapping different than the first. Thus, in response to the same MUX state information, the logic controller will set the analog switches in a manner consistent with the requirements of the specific imaging system identified by the System ID signal.

In accordance with the preferred embodiment, the logic controller 50 (see FIG. 3) is a field programmable gate array (FPGA) or similar type of programmable logic controller. The SYS(1:0) data is hard coded into the hardware of the transducer interface (not shown) and is read by the FPGA as part of each load sequence. While the design of this system family can accommodate up to four system types (e.g., systems having 32, 64, 126 or 256 channels) with the two-bit address, the design could easily be adapted to include a wider variety of systems. In each case, the "smart" multiplexer connects the appropriate number of elements to the system channels and then steps this aperture through the transducer array as a function of multiplexer state.

A logical extension of the "smart probe" is the introduction of a programmable multiplexer which receives instructions from the imaging system prior to the initialization of a scan. In this embodiment, the system senses the presence of the probe through connection of specific pins or an action by the operator. The system reads the probe type either through a hardware encoded signature or by means of an integral memory device. Based on the probe type, the system loads the probe multiplexer through a serial data communications link (shown as a conventional JTAG interface in FIG. 4) and then begins normal imaging operations. The logic controller in this embodiment is a device which is programmable prior to each use, whereby a MUX state mapping is written into internal memory map. The logic controller then operates to control the state sequence for the probe multiplexer in accordance with that stored MUX state mapping. In operation on a different imaging system having a different channel count, the same sequence occurs, but the program uploaded into the logic controller by the system is different.

In summary, the multiplexer used in the probes described herein is configurable for systems of different channel count. In accordance with one preferred embodiment, the logic controller onboard the probe assembly senses system type and in response thereto, automatically selects one of at least two internally stored MUX state mappings to be used to reconfigure the multiplexer. Alternatively, the logic controller onboard the probe assembly is programmed by the system to which it is connected with a MUX state mapping unique to the particular system type. In the latter case, the logic controller has only one MUX state mapping stored therein at any given time.

Figure 4:
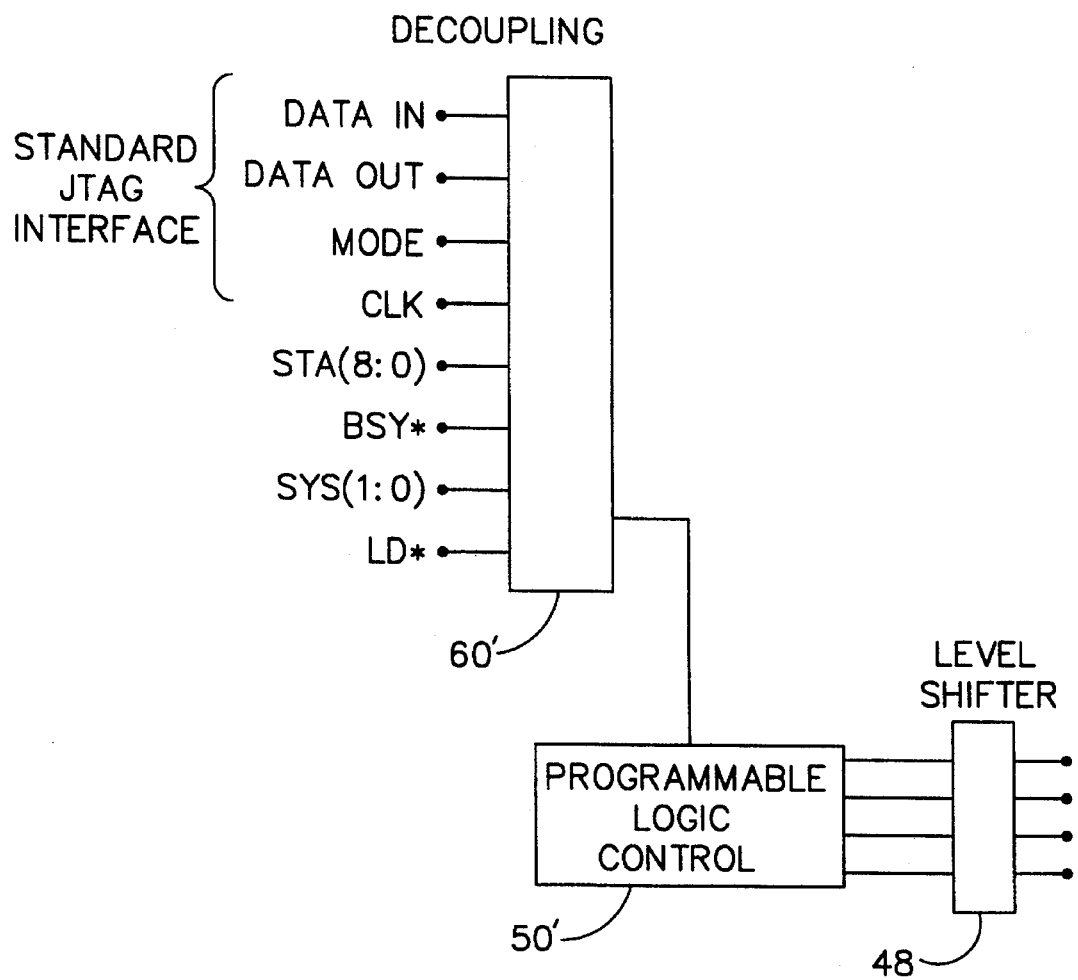
FIG. 4 is a block diagram showing a modification of the transducer multiplexer circuit depicted in FIG. 3 wherein a system-programmable logic controller is substituted for the pre-programmed logic controller.

The designation 12P in FIG. 4 indicates an LC-filtered version of a +12-V supply; 15N indicates a −15-V supply; and HV indicates a high-voltage bias voltage, namely +140 V.

The foregoing preferred embodiments have been disclosed for the purpose of illustration. Variations and modifications will be readily apparent to those skilled in the art of ultrasound imaging systems. In particular, the concept of the present invention is not limited to any particular location of the logic controller for reconfiguring the probe multiplexer in response to MUX state information. For example, if the probe multiplexer is built into the connector of the probe assembly, the logic controller could also be built into the connector or, in the alternative, could be incorporated on the transducer interface board of the imaging system. Alternatively, if the probe multiplexer is built into the transducer head of the probe assembly, the logic controller could also be built into the transducer head or, in the alternative, could be incorporated on the transducer connector or on the transducer interface board. All such variations and modifications are intended to be encompassed by the claims set forth hereinafter.

I claim:

1. An apparatus comprising an ultrasound imaging system and a transducer probe assembly which is connectable to said ultrasound imaging system, wherein:

said ultrasound imaging system comprises a multiplicity of channels and means for generating a first predetermined system identification signal indicating the number of said channels in said ultrasound imaging system; and said transducer probe assembly comprises:

an array of ultrasound transducer elements the number of channels of said ultrasound imaging system being greater than the number of transducer elements of said array;

means for multiplexing imaging data between said array of ultrasound transducer elements and said multiplicity of channels when said transducer probe assembly is connected to said ultrasound imaging system;

means for storing first and second multiplexer state mappings, said first multiplexer state mapping consisting of a multiplicity of multiplexer states for multiplexing signals between said array of ultrasonic transducer elements and a first predetermined number of channels equal to the number of channels of said ultrasound imaging system and said second multiplexer state mapping consisting of a multiplicity of multiplexer states for multiplexing signals between said array of ultrasonic transducer elements and a second predetermined number of channels different than said first predetermined number; and logic control means for selectively configuring said multiplexing means in accordance with said first multiplexer state mapping in response to receipt of said first predetermined system identification signal from said ultrasound imaging system and in accordance with said second multiplexer state mapping in response to receipt of a second predetermined system identification signal different than said first predetermined system identification signal.

2. The apparatus as defined in claim 1, wherein said multiplexing means comprises a multiplicity of settable analog switches, and said logic control means selectively configure said multiplexing means by setting said analog switches.

3. The apparatus as defined in claim 2, wherein said ultrasound imaging system further comprises means for generating a multiplexer state signal, and wherein said logic control means selectively configures said multiplexing means in accordance with a multiplexer state identified by said multiplexer state signal and retrieved from said first multiplexer state mapping.

4. The apparatus as defined in claim 1, wherein said logic control means and said storing means are incorporated into a field programmable gate array.

5. The apparatus as defined in claim 1, wherein said transducer probe assembly further comprises a transducer connector which couples to a port in said ultrasound imaging system, and said logic control means and said multiplexing means are integrated into said transducer connector.

6. The apparatus as defined in claim 5, wherein said transducer connector comprises means for transmitting said system identification signal from said system identification signal generating means of said ultrasound imaging system to said control logic means of said transducer probe assembly, and means for transmitting said multiplexer state signal from said multiplexer state signal generating means of said ultrasound imaging system to said control logic means of said transducer probe assembly.

7. An apparatus comprising an ultrasound imaging system and a transducer probe assembly which is connectable to said ultrasound imaging system, wherein:

said ultrasound imaging system comprises a multiplicity of channels having a predetermined channel count and means for outputting a first predetermined system identification signal indicating said predetermined channel count; and said transducer probe assembly comprises:
an array of ultrasound transducer elements having a predetermined element count, said predetermined channel count being greater than said predetermined element count;
means for multiplexing imaging data between said array of ultrasound transducer elements and said multiplicity of channels when said transducer probe assembly is connected to said ultrasound imaging system;
means for storing a multiplexer state mapping consisting of a multiplicity of multiplexer states for multiplexing signals between said array of ultrasonic transducer elements and said multiplicity of channels of said ultrasound imaging system; and
logic control means for selectively configuring said multiplexing means in accordance with said multiplexer state mapping, wherein said ultrasound imaging system further comprises means for loading said multiplexer state mapping into said storing means as a function of a probe identification signal from said transducer probe assembly.

8. The apparatus as defined in claim 7, wherein said multiplexing means comprises a multiplicity of settable analog switches, and said logic control means selectively configure said multiplexing means by setting said analog switches.

9. The apparatus as defined in claim 8, wherein said ultrasound imaging system further comprises means for generating a multiplexer state signal, and wherein said logic control means selectively configures said multiplexing means in accordance with a multiplexer state identified by said multiplexer state signal and retrieved from said multiplexer state mapping.

10. The apparatus as defined in claim 8, wherein said logic control means and said storing means are incorporated into a field programmable gate array.

11. The apparatus as defined in claim 7, wherein said transducer probe assembly further comprises a transducer connector which couples to a port in said ultrasound imaging system, and said logic control means and said multiplexing means are integrated into said transducer connector.

12. The apparatus as defined in claim 11, wherein said transducer connector comprises means for transmitting said multiplexer state signal from said multiplexer state signal generating means of said ultrasound imaging system to said control logic means of said transducer probe assembly.

13. A transducer probe assembly which is utilizable with ultrasound imaging systems having different channel counts, comprising:

an array of ultrasound transducer elements having a predetermined element count;
a multiplicity of transducer output channels having a predetermined channel count, said predetermined channel count being greater than said predetermined element count;
means for multiplexing imaging data from said array of ultrasound transducer elements to said multiplicity of transducer output channels;
means for storing a first multiplexer state mapping consisting of a multiplicity of multiplexer states for multiplexing signals between said array of ultrasonic transducer elements and a first predetermined number of said multiplicity of transducer output channels; and
logic control means for selectively configuring said multiplexing means in accordance with said first multiplexer state mapping.

14. The transducer probe assembly as defined in claim 13, wherein said storing means further stores a second multiplexer state mapping consisting of a multiplicity of multiplexer states for multiplexing signals between said array of ultrasonic transducer elements and a second predetermined number of said multiplicity of transducer output channels, said second predetermined number being different than said first predetermined number.

15. The transducer probe assembly as defined in claim 14, further comprising means for receiving a system identification signal from the system to which said transducer probe assembly is connected, said system identification signal indicating that the connected system has a number of receive channels equal to one of said first and second predetermined numbers, wherein said logic control means reconfigures said multiplexing means in accordance with said first multiplexer state mapping if said system identification signal indicates that the connected system has said first predetermined number of receive channels and in accordance with said second multiplexer state mapping if said system identification signal indicates that said system has said second predetermined number of receive channels.

16. The transducer probe assembly as defined in claim 15, wherein said multiplexing means comprises a multiplicity of settable analog switches, and said logic control means reconfigures said multiplexing means by setting said analog switches.

17. The transducer probe assembly as defined in claim 15, further comprising means for receiving a multiplexer state signal from the system to which said transducer probe assembly is connected, wherein said logic control means reconfigures said multiplexing means in accordance with a multiplexer state identified by said multiplexer state signal and retrieved from one of said first and second multiplexer state mappings determined from said system identification signal.

18. The transducer probe assembly as defined in claim 13, wherein said logic control means and said storing means are incorporated into a programmable logic device.

* * * * *